(12) United States Patent
Dayal et al.

(10) Patent No.: US 10,966,059 B1
(45) Date of Patent: Mar. 30, 2021

(54) LOCATION TRACKING AND DISTANCE MONITORING SYSTEM AND ASSOCIATED METHOD

(71) Applicant: Siemens Industry, Inc., Alpharetta, GA (US)

(72) Inventors: Mohit Dayal, Alpharetta, GA (US); Firas Khalil, Cumming, GA (US); Vikas Garg, Alpharetta, GA (US); Mark Egervari, Alpharetta, GA (US); Mohamad El Naamani, Alpharetta, GA (US); Clayton T. French, Atlanta, GA (US); Artur Ottlik, Duluth, GA (US); Navneet Sharma, Cumming, GA (US); Malika Tandon, Alpharetta, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 16/931,062

(22) Filed: Jul. 16, 2020

(51) Int. Cl.
  *H04W 4/029* (2018.01)
  *H04L 29/08* (2006.01)
  *H04W 64/00* (2009.01)
  *H04W 4/80* (2018.01)
  *G08B 21/02* (2006.01)

(52) U.S. Cl.
  CPC ........ *H04W 4/029* (2018.02); *G08B 21/0269* (2013.01); *H04L 67/18* (2013.01); *H04W 4/80* (2018.02); *H04W 64/003* (2013.01)

(58) Field of Classification Search
  CPC combination set(s) only.
  See application file for complete search history.

(56) References Cited

U.S. PATENT DOCUMENTS

| | | | |
|---|---|---|---|
| 10,448,211 B1* | 10/2019 | Shen | G06K 7/10366 |
| 2010/0237995 A1* | 9/2010 | Iwahashi | G06K 7/10346 340/10.1 |
| 2011/0106437 A1* | 5/2011 | Husain | G08B 21/0236 701/408 |
| 2020/0234098 A1* | 7/2020 | Volkerink | G06K 19/07773 |

* cited by examiner

*Primary Examiner* — Thomas S McCormack

(57) ABSTRACT

A location tracking and distance monitoring system includes a plurality of portable transponders, each portable transponder having a wireless transmitter and configured to transmit location data, a location database storing the location data transmitted by the plurality of portable transponders, wherein each portable transponder is identified as a tag with co-ordinates in the location database, a distance monitoring module comprising at least one processor and configured via computer executable instructions to access the location data from the location database, define a coverage region with a coverage radius around each tag, determine overlapping zones of the coverage regions of the tags, and generate tag clusters based on the overlapping zones. Further, an associated method and computer readable medium are provided.

20 Claims, 6 Drawing Sheets

LOCATION TRACKING AND DISTANCE MONITORING SYSTEM AND ASSOCIATED METHOD

BACKGROUND

1. Field

Aspects of the present disclosure generally relate to a location tracking and distance monitoring system and an associated method, specifically for monitoring distances or distancing, such as for example social or physical distancing.

2. Description of the Related Art

In general, location tracking refers to technologies that physically locate and electronically record and track the movement of people or objects. Location tracking technology is in use every day with for example global position system (GPS) navigation. Real-time location systems, also referred to as RTLS, are used to automatically identify and track the location of people or objects in real time, for example within a building or other contained area. Examples of real-time location systems include tracking automobiles through an assembly line, locating pallets of merchandise in a warehouse or finding medical equipment in a hospital.

New challenges require new approaches and solutions. An example of a new and current challenge is the coronavirus pandemic which is an ongoing global pandemic of coronavirus disease 2019. As there is currently no vaccine to prevent the disease, the best way to prevent illness is to avoid being exposed to the virus. Protection measures to avoid being exposed include washing hands often and avoid close contact between people. As plants and manufacturing facilities work to return to full capacity with the new challenges created by the pandemic, operation managers and health and safety officials must keep employees safe while also optimizing production. Guidelines from governments and health experts recommend social distancing to minimize risk to employee health. Without a location tracking system, it is difficult to know whether employees can adhere to these guidelines and identify hidden trouble areas in a facility.

SUMMARY

Briefly described, aspects of the present disclosure generally relate to a location tracking and distance monitoring system and an associated method, specifically for monitoring social or physical distances or distancing between people, for example during the coronavirus pandemic. However, it should be noted that the described system and method may be used and performed in connection with other applications requiring location tracking and distance monitoring, such as monitoring distances between objects or people in certain environments, for example unsafe or hazardous environments. Other examples include delivery vehicles/automated guided vehicles route optimization applications.

A first aspect of the present disclosure provides a location tracking and distance monitoring system comprising a plurality of portable transponders, each portable transponder comprising a wireless transmitter and configured to transmit location data, a location database storing the location data transmitted by the plurality of portable transponders, wherein each portable transponder is identified as a tag with co-ordinates in the location database, a distance monitoring module comprising at least one processor and configured via computer executable instructions to access the location data from the location database, define a coverage region with a coverage radius around each tag, determine overlapping zones of the coverage regions of the tags, and generate tag clusters based on the overlapping zones.

A second aspect of the present disclosure provides a method for tracking location and monitoring distance comprising, through operation of at least one processor, accessing location data of multiple portable transponders from a location database, wherein each portable transponder is identified in the database as a tag comprising co-ordinates, defining a coverage region with a coverage radius around each tag, determining overlapping zones of the coverage regions of the tags, and generating tag clusters based on the overlapping zones.

A third aspect of the present disclosure provides a non-transitory computer readable medium encoded with processor executable instructions that when executed by a computing device, cause the computing device to perform a method for tracking location and monitoring distance as described herein.

DETAILED DESCRIPTION

To facilitate an understanding of embodiments, principles, and features of the present disclosure, they are explained hereinafter with reference to implementation in illustrative embodiments. In particular, they are described in the context of being systems and methods for tracking locations and monitoring distances. Embodiments of the present disclosure, however, are not limited to use in the described systems, devices or methods.

The present disclosure relates to finding new uses for location data, in particular real time location data, provided by mobile/portable transponders attached to and carried by people or other movable objects, wherein a location database stores the location data from the transponders.

Figure 1:
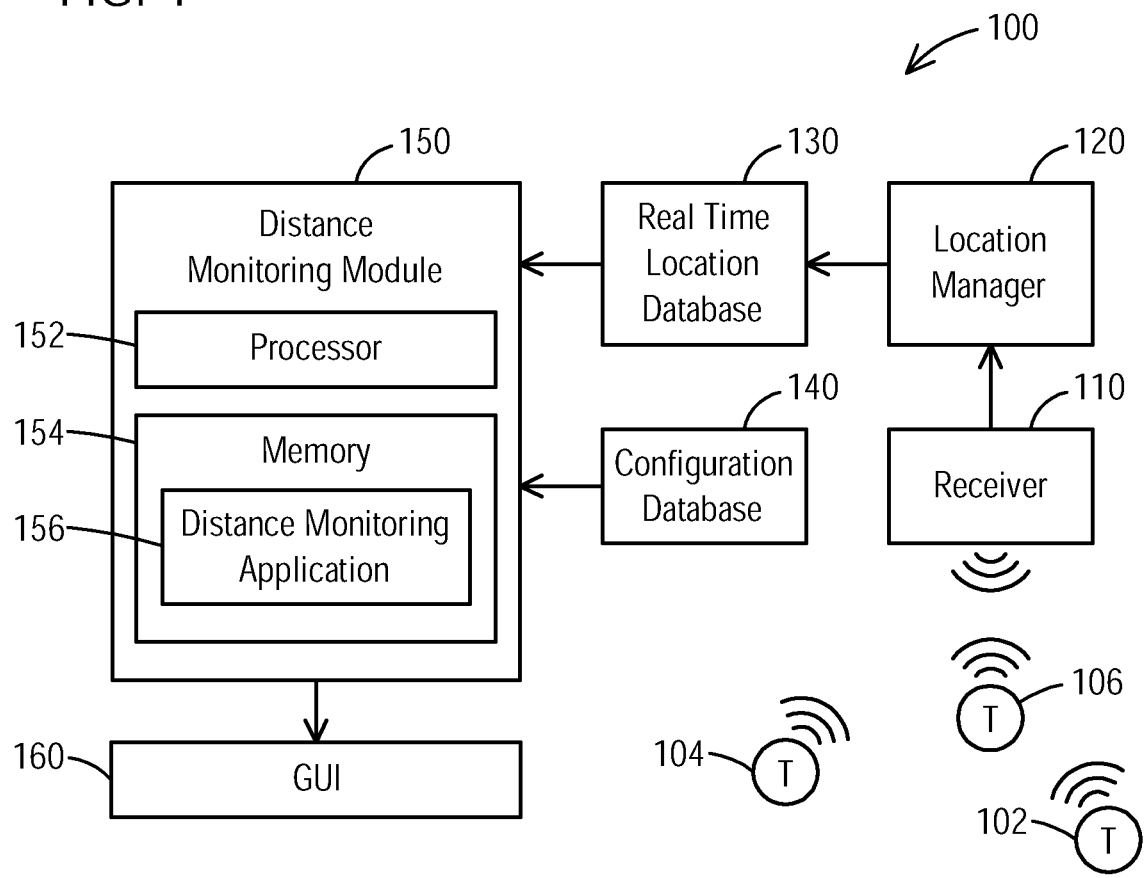
FIG. 1 illustrates a simplified block diagram of a location tracking and distance monitoring system in accordance with an exemplary embodiment of the present disclosure.

FIG. 1 illustrates a simplified block diagram of a location tracking and distance monitoring system 100 in accordance with an exemplary embodiment of the present disclosure.

An example of a scenario or application of the location tracking and distance monitoring system 100 is in a manufacturing facility, assembly facility, other facility or area where many employees (people) work and move to perform different tasks.

The location tracking and distance monitoring system 100, herein also simply referred to as system 100, comprises a plurality of portable transponders 102, 104, 16, wherein each portable transponder 102, 104, 106 comprises a power source, a wireless transmitter and is configured to transmit location data. A portable transponder 102, 104, 106 is carried by or attached to a person, for example an employee working in a manufacturing facility. In our example of FIG. 1, three people, for example three employees working in manufacturing, each carry a transponder 102, 104, 106. It should be noted that typically many more transponders participate in a scenario or application, wherein the number of transponders may be several hundred transponders carried by several hundred people. In other examples, the mobile transponders 102, 104, 106 may be attached to moving objects, such as for example robots.

The active transponders 102, 104, 106 emit a signal, such as a radio signal, at defined intervals, wherein the signal comprises location data or position information of the respective transponder 102, 104, 106 moving within a specific area. The emitted information or data (signal) is received wirelessly by at least one receiver 110 (in some cases the receiver is also known as an anchor). The system 100 may comprise more than one receiver 110, depending on for example a layout of a floorplan of the manufacturing facility and/or a number of participating employees with transponders. In case of multiple receivers 110, they are synchronized receivers 110. Receiver(s) 110 are stationary and can be wall mounted or mounted to other stationary objects of the facility.

The at least one receiver 110 collects the data or information from the three transponders 102, 104, 106 and transmits the collected location data together with transponder ID numbers and a precise receiving time to a location manager 120. In another example, the at least one receiver 110 may transmit the collected location data via a gateway to the location manager 120. The location manager 120 is a computing device, embodied for example as location server.

In another embodiment, the transponders 102, 104, 106 may be equipped with data interfaces and transmit location details directly to the location manager 120 or another local control system.

Signal and/or data transmission between transponders 102, 104, 106, the at least one receiver 110 and location manager 120 may be wireless or wired. For example, the system 100 may use wireless ultra-wideband (UWB) technology to facilitate communications between active transponders 102, 104, 106 and receiver(s) 110. Other wireless communication links may include wireless LAN (over Internet access point), cellular/mobile network(s) or other radio technology, such as for example via cellular V2X or standard LTE (3G, 4G, 5G). Data transmission between receiver(s) 110 and location manager 120 may be wired and may include Ethernet transmission. In another example, communication between receiver(s) 110 and location manager 120 may also be wireless.

The system 100 utilizes real time location data. The location manager 120 uses the location data transmitted by the transponders 102, 104, 16 as reference points for real-time positioning calculations executed by the location manager 120. The location manager 120 comprises software that continually calculates positions of each transponder 102, 104, 106, for example using a method called Time Difference of Arrival (TDoA). The location manager 120 calculates for example real time positions of each transponder 102, 104, 106 on a specific manufacturing floor within the manufacturing facility. Thus, the positions of the employees or personnel carrying the transponders 102, 104, 106 is known in real time.

The real time location data is stored in a location database 130, which includes suitable memory for storing the location data of each transponder 102, 104, 106. Each transponder 102, 104, 106 has an identification in the database and is identified as a tag with co-ordinates. The co-ordinates of each tag and thus transponder 102, 104, 106 can be 2-dimensional or 3-dimensional.

The location database 130 may be a separate database or may be integrated in other computing devices, such as for example the location manager 130. The location database 130 may be local database of the facility or may be a remote database, for example a cloud-based database.

The system 100 further comprises a distance monitoring module 150 which is embodied as software or a combination of software and hardware. The distance monitoring module 150 comprises at least one processor 152 (or other computing device) and is configured via computer executable instructions to perform a location tracking and distance monitoring application 156. The distance monitoring module 150 may further comprise a memory 154 (volatile or non-volatile) storing for example instructions (software) for a variety of applications. One of the applications includes the location tracking and distance monitoring application 156.

The system 100 may further comprise a configuration database 140 storing different configuration features or applications, for example with respect to the application 156.

The distance monitoring module 150 may be a separate module or may be an existing module programmed to perform a method as described herein. For example, the module 150 may be incorporated, for example programmed, into an existing facility management device by means of software.

The distance monitoring module 150 can be further coupled to a graphical user interface 160 for outputting and/or displaying information related to the location tracking and distance monitoring application 154 to a user. The application 154 and associated method will be described in detail in the following.

Those of ordinary skill in the art will recognize that not all details are shown in the simplified diagram of the system 100. The system 100 may comprise additional components for different applications or methods. For example, the location manager 120 may also be connected to further devices, may store additional data or information or may provide data to different applications.

Figure 2:
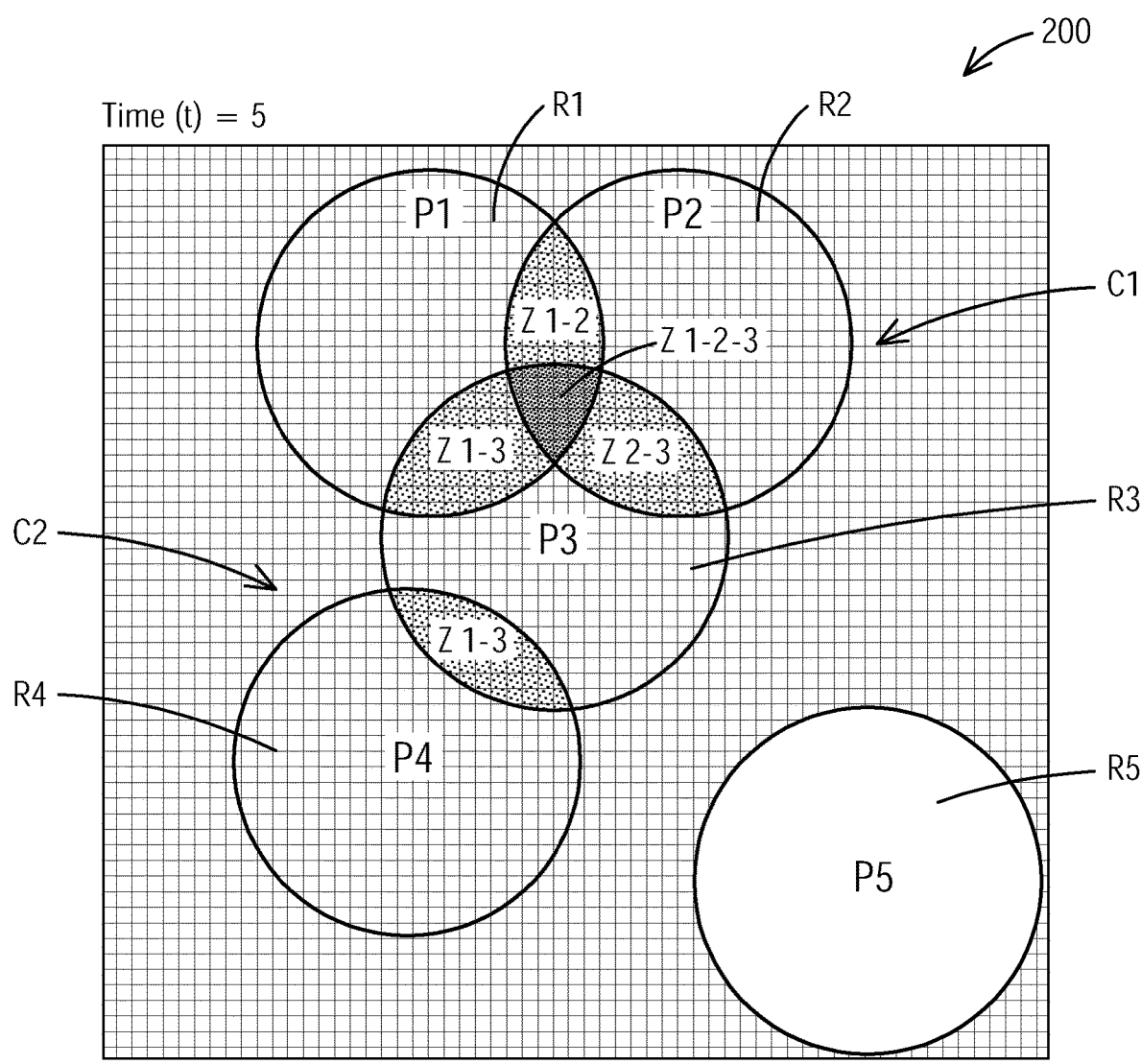
FIG. 2 illustrates a diagram of tag clusters in accordance with an exemplary embodiment of the present disclosure.

FIG. 2 illustrates a diagram 200 of tag clusters in accordance with an exemplary embodiment of the present disclosure.

In an exemplary embodiment, the distance monitoring module 150 is configured to access the location data from the location database 130 and obtains real time location data of the mobile active transponders 102, 104, 106. The distance monitoring module 150 continually accesses and obtains real time location data, for example every second or every 400 milli seconds.

As described before, each portable transponder 102, 104, 106 is identified as a tag with co-ordinates in the location database 130. For example, each tag comprises x, y co-ordinates (two dimensions). In another example, the tag may comprise x, y, z co-ordinates (three dimensions). Diagram 200 shows multiple tags P1, P2, P3, P4 and P5, wherein each tag P1-P5 represents or identifies an active transponder attached to a person.

The distance monitoring module 150 is configured to define a coverage region R with a coverage radius around each tag P1-P5. The coverage region is a circular region with a predefined radius around each tag. Tag P1 comprises coverage region R1, tag P2 comprises coverage region R2 etc. The coverage radius of each region R1-R5 is a predefined radius and can be for example 3 feet, corresponding to for example a recommended distance of 6 feet between people in view of the coronavirus pandemic. Of course, the coverage radius/diameter can be arbitrarily selected or changed according to a specific application or scenario. In our example, each tag P1-P5 has the same coverage radius.

The distance monitoring module 150 is configured to determine overlapping zones Z of the coverage regions R1-R5 of the tags P1-P5 and to generate tag clusters C1 and C2 based on the overlapping zones Z. A tag cluster is herein also referred to as violation cluster.

Diagram 200 illustrates overlapping zones Z 1-2, Z 1-3, Z 2-3, Z 1-2-3 and Z 3-4. Zone Z 1-2 is an overlapping zone between coverage regions R1 and R2 of tags P1 and P2, zone Z 1-3 is an overlapping zone between coverage regions R1 and R3 of tags P1 and P3, zone Z 2-3 is an overlapping zone between coverage regions R2 and R3 of tags P2 and P3 and zone Z 3-4 is an overlapping zone between regions R3 and R4 of tags P3 and P4. Zone Z 1-2-3 is an overlapping zone between regions R1, R2 and R3 of tags P1, P2 and P3. As FIG. 2 shows, zone Z 1-2-3 is part of zones Z 1-2, Z 1-3 and Z 2-3, where all three coverage regions R1, R2 and R3 overlap.

Diagram 200 further illustrates tag clusters C1 and C2 which are based on the overlapping zones Z. Tag clusters are formed or generated for tags that share overlapping zones with other tags. In our example, tags P1, P2, P3 form tag cluster C1 and tags P3 and P4 form tag cluster C2. Tag P5 is not involved in any overlapping zone Z or any tag cluster at this specific point in time.

Diagram 200 illustrates the tags P1-P5, zones Z and tag clusters C1, C2 at a specific point in time, for example time (t)=5. The module 150 continually (constantly) performs or carries out the distance monitoring application 156 as new real time location data are continually provided by the transponders 102, 104, 106 and accessed/obtained by the module 150.

The distance monitoring module 150 is further configured to identify tag pairs of each tag cluster C1 and C2 and calculate a dwell time for each tag pair while the tag pair is associated with the tag cluster C1 and C2. In our example, cluster C1 includes tag pairs P1-P2, P1-P3, P2-P3 and P3-P4. For each tag pair, a dwell time is calculated. For example, tag pair P1-P2 may comprise a dwell time of 60 seconds, tag pair P1-P3 may comprise a dwell time of 10 minutes. This means that tag pair P1-P2 shared overlapping zone Z 1-2 for 60 seconds, which means that the people carrying the respective transponders of tags P1 and P2 were less than 6 feet apart from each other for 60 seconds.

The calculated dwell time of each tag pair is then compared to or evaluated with respect to a predefined period (dwell time threshold), which can be for example 15 minutes, previously defined and stored. When the calculated dwell time of a tag pair exceeds or is greater than the predefined period, a dwell time violation is triggered, and an alert generated.

A tag cluster violation (dwell time violation) is triggered when there is a consistent violation by a specific tag for the duration in the specific cluster. If the tag moves out of the tag cluster before predefined dwell period, no violation is triggered. If a tag moves out of the tag cluster and then returns into the same tag cluster within the predefined dwell period, the dwell time resets and starts counting again. If a tag moves from one tag cluster to another tag cluster, then a previous dwell time (of the first cluster) is not considered for the following tag cluster. When a tag is moving along with the tag cluster, a violation is triggered when the dwell time is greater than the predefined period. In our example from above, no dwell time violation alert is generated because dwell times of 60 seconds and 10 minutes are less than the predefined period (threshold) of 15 minutes.

In an embodiment, such a dwell time violation alert may be displayed on the graphical user interface 160, see FIG. 1. In another embodiment, the dwell time violation alert may trigger the corresponding transponder of the tag to notify the carrier of the transponder. For example, the respective transponder may issue a vibration, sound or other type of alert to the user of the transponder notifying the user that she or he has been in close contact (for example less than 6 feet) to another person for more than the predefined dwell period. In another embodiment, the transponder can be configured as a transponder comprising a display, wherein the display may illustrate data or information such as location information or transponder identity information. The display may display the dwell time violation and may further display an action that should be taken by the user, for example "Dwell time violation alert—Please stay at least 6 feet from other people" or "Violation! Please step back".

Figure 3:
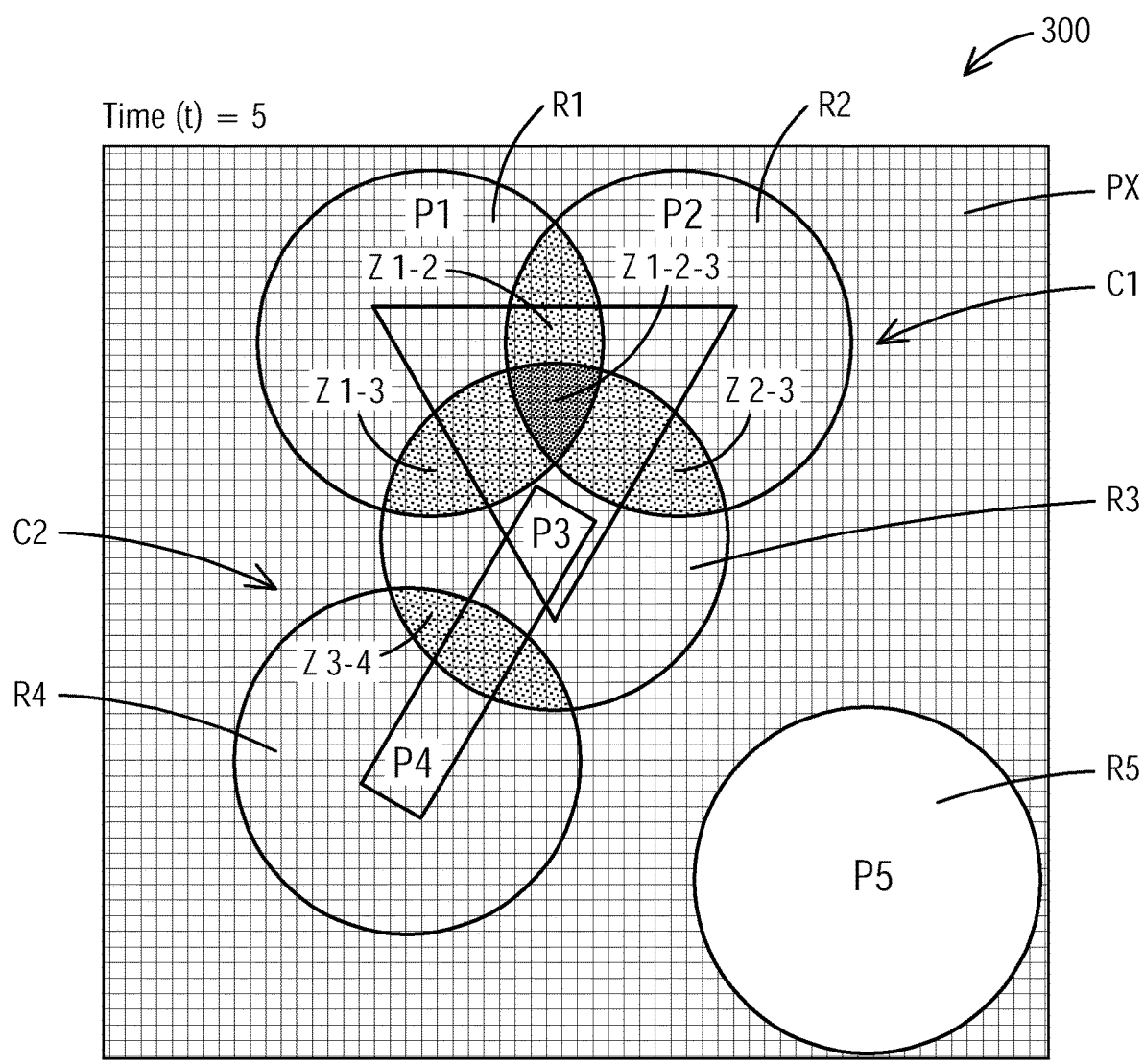
FIG. 3 illustrates a diagram of tag clusters and an intensity map in accordance with an exemplary embodiment of the present disclosure.

FIG. 3 illustrates a diagram 300 of tag clusters and an intensity map in accordance with an exemplary embodiment of the present disclosure. FIG. 3 refers to the example illustrated in FIG. 2 comprising tags P1-P5 and violation clusters C1 and C2.

As illustrated, the coverage regions R1-R5 around each tag P1-P5 comprise pixels PX, wherein each pixel PX represents a segment of an area. Every pixel PX corresponds to a section of a physical area, for example N(ft)×N(ft). For example, each pixel PX represents a segment of a specific floor of the manufacturing facility, such as a square of 0.5 ft×0.5 ft of the specific floor. A floor plan or map of the specific area or floor, where the location tracking and distance monitoring is performed, can be uploaded directly into the module 150/application 156 and is then adapted or configured to include the pixels PX.

The distance monitoring module 150 is configured to calculate a collision density for each pixel PX in an overlapping zone Z based on a number of tags P1-P5 associated with the overlapping zone Z. This means that an overlapping zone Z with a higher number of associated tags comprises a higher collision density than a zone with a lower number of associated tags. Further, the distance monitoring module 150 is configured to generate an intensity map based on the collision density calculated for each pixel PX, wherein an intensity indicator is based on the collision density.

For example, overlapping zone Z 1-2-3 relates to a higher number of tags (three tags) associated with this zone Z 1-2-3 (tag cluster C1), which means that zone Z 1-2-3 comprises a collision density and intensity indicator which is higher than collision density and intensity indicator of zone Z 1-2 because less tags (two tags) are associated with zone Z 1-2.

The intensity map can also be referred to as heat map, wherein the intensity or heat indicator can be a specific color or pattern. For example, zone Z 1-2-3 can be colored red indicating a higher collision density and higher possibility to contract the virus. In other words, every pixel PX inside an overlapping zone Z is evaluated for their collision density, wherein a higher collision density implies higher possibility to catch the infection (coronavirus). The more tags are associated with an overlapping zone Z, the higher the collision density and intensity indicator of that zone Z. Zones Z 1-2, Z 1-3, Z 2-3 and Z 3-4 comprise a low collision density and thus low intensity indicator, whereas zone Z 1-2-3 comprises a high collision density and thus high intensity indicator. Therefore, zone Z 1-2-3 is most vulnerable.

Figure 4:
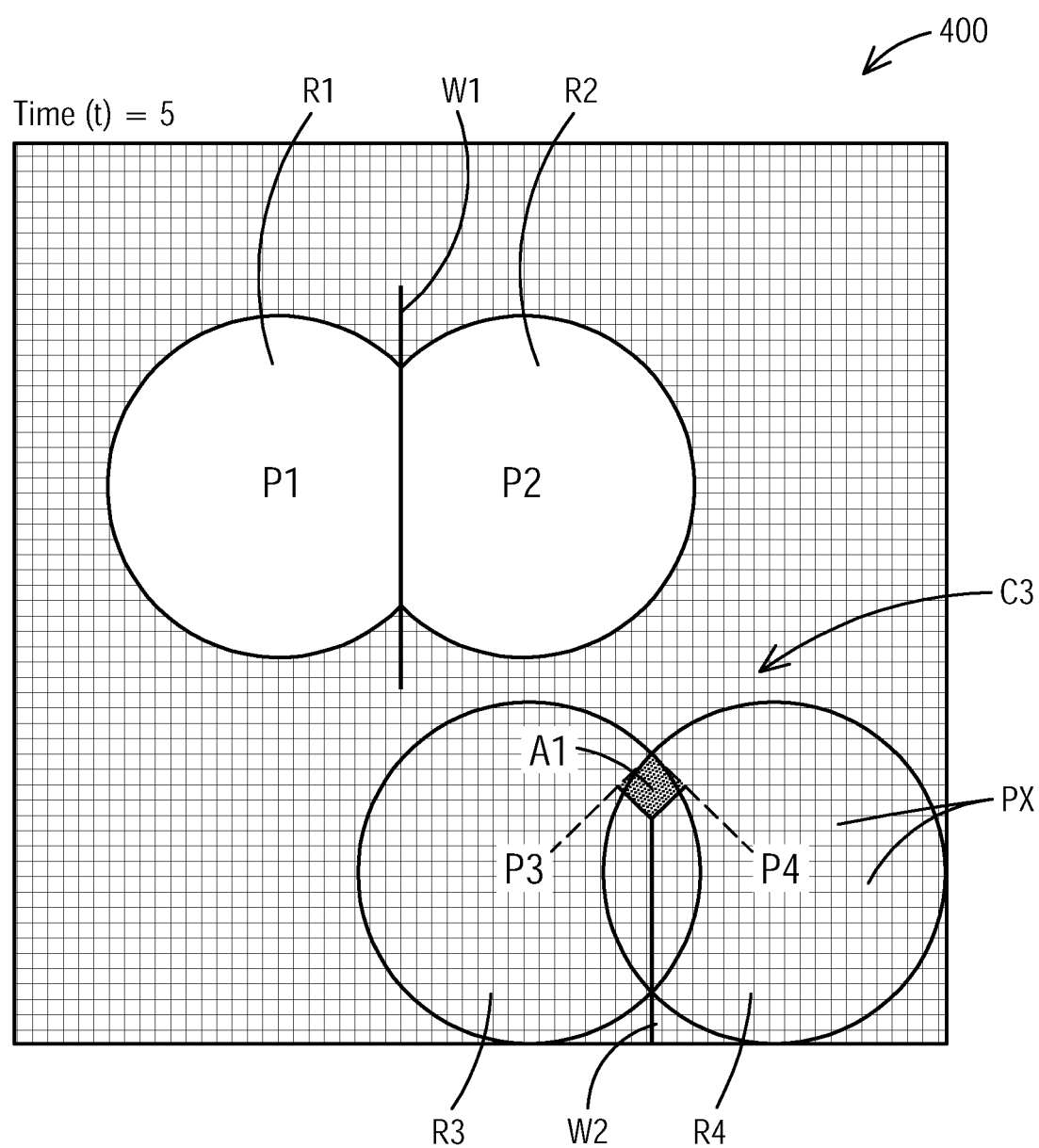
FIG. 4 illustrates a diagram of tag clusters and obstructing objects in accordance with an exemplary embodiment of the present disclosure.

FIG. 4 illustrates a diagram 400 of tags and obstructing objects in accordance with an exemplary embodiment of the present disclosure.

Diagram 400 illustrates another example of tags P1, P2, P3 and P4 including their coverage region R1, R2, R3 and R4. As described before, each tag P1-P4 is an identification of a transponder attached to an employee/person. Each tag P1-P4 includes a coverage region R1, R2, R3 and R4, wherein each coverage region R1-R4 comprises pixels PX which represent a segment of an actual area, such as a floor of a building.

An actual floor or building area may include walls, internal windows or other objects defining different spaces in the area. A previously uploaded and stored floor plan or map of the physical area or floor includes such walls etc. which may be referred to as obstructing objects. The diagram 400 illustrates a fully stretched wall W1 between tags P1 and P2, and a partly stretched wall W2 between tags P3 and P4.

In an embodiment, the distance monitoring module 150 is configured to validate the pixels PX of each tag P1-P4 such that the tags P1-P4 and the pixels PX of the coverage regions R1-R4 around the tag are within the area (floor) and are not obstructed by an object in the area, such as wall W1 and wall W2.

Because the tags P1 and P2 are divided by the fully stretched wall W1 between the coverage regions R1 and R2 which entirely separates the coverage regions R1 and R2, tags P1 and P2 do not comprise an overlapping zone and are thus not involved in a tag cluster. Otherwise, without wall W1, tags P1 and P2 would have an overlapping zone and would thus form a tag cluster.

Tags P3 and P4 have the partly stretched wall W2 between them, however, the wall W2 only partly separates the coverage regions R1 and R2. The coverage regions R1 and R2 comprise a small overlapping zone A1 which is considered for collision density calculation. Tags P3 and P4 form tag cluster C3 because they have overlapping zone A1. Collision density for each pixel PX is calculated based on its angular position from every tag P3, P4 involved in the tag cluster C3 and every obstruction (wall W2) present in between. Any kind of obstruction or object between tags is considered in a collision density calculation.

Figure 5:
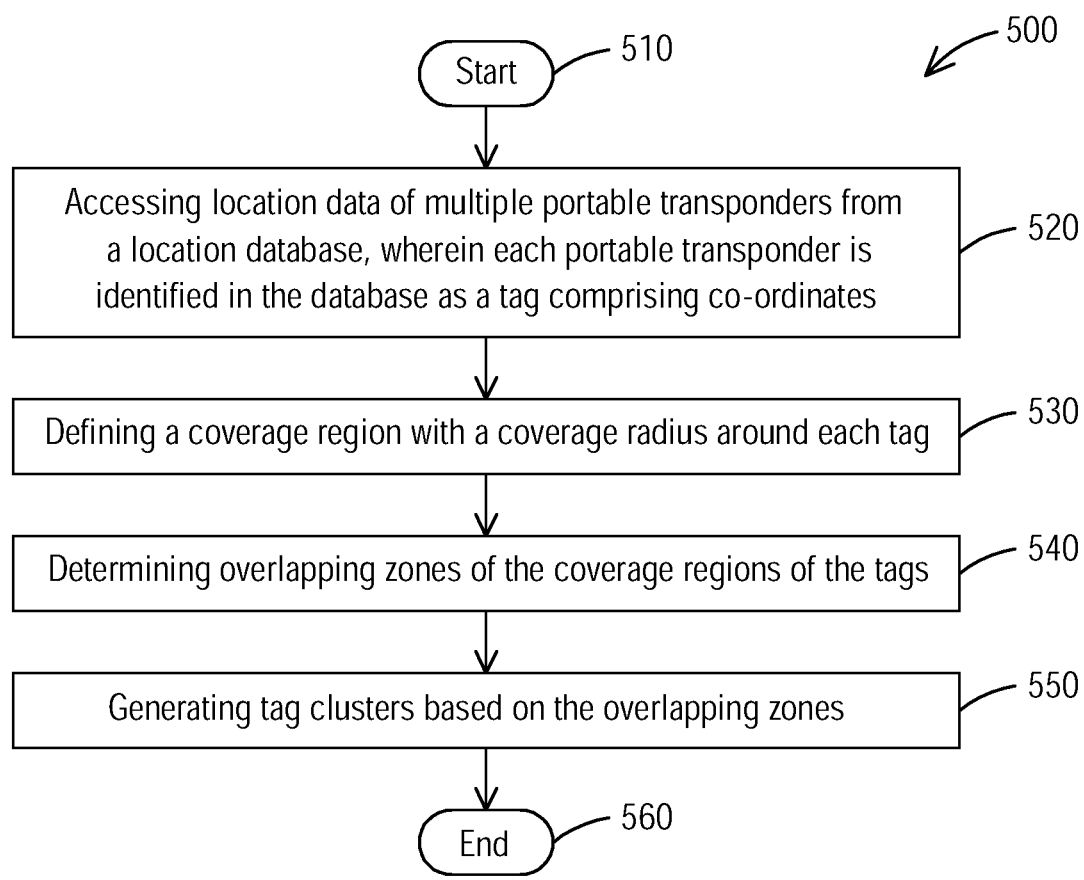
FIG. 5 illustrates a flow chart of a method for tracking location and monitoring distance in accordance with an exemplary embodiment of the present disclosure.

FIG. 5 illustrates a flow chart of a method 500 for tracking location and monitoring distance in accordance with an exemplary embodiment of the present disclosure.

While the method 500 is described as a series of acts that are performed in a sequence, it is to be understood that the method 500 may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The method 500 relates to features and elements described in connection with the location tracking and distance monitoring system 100 and distance monitoring module 150. Thus, certain elements or features described within the method 500 relate to the system 100 or module 150, wherein the same reference numerals refer to the same elements or features of the figures.

The method 500 described with reference to FIG. 5 provides a general and simplified method for distance monitoring. The method may start at 510. Act 520 includes accessing location data of multiple portable transponders 102, 104, 106 from a location database 130, wherein each portable transponder 102, 104, 106 is identified in the database 130 as a tag P1, P2, P3, P4, P5 comprising co-ordinates. The location data comprise real time location data and accessing the location data comprises continually accessing real time location data. An act 530 comprises defining a coverage region R1, R2, R3, R4, R5 with a coverage radius around each tag P1-P5. Act 540 comprises determining overlapping zones Z of the coverage regions R1-R5 of the tags P1-P5, and act 550 includes generating tag clusters C1, C2, C3 based on the overlapping zones Z. At 560, the method may end.

In another embodiment, the method 500 may further comprise identifying tag pairs of each tag cluster C1, C2, C3, and calculating a dwell time for each tag pair while the tag pair is associated with the tag cluster C1, C2, C3. In another embodiment, the method 500 may further comprise generating a dwell time violation alert when a calculated dwell time of the tag pair associated with the tag cluster is greater than a predefined period.

Each coverage region R1-R5 comprises pixels PX which represent or identify a section of an actual (physical) area, such as a floor of a building. The method 500 may further comprise validating the pixels PX such that the tag P1-P5 and the pixels PX of the coverage region R1-R5 around the tag P1-P5 are within the area and are not obstructed by an object in the area.

In another embodiment, the method 500 may further comprise calculating a collision density for each pixel PX in an overlapping zone Z based on a number of tags P1-P5 associated with the overlapping zone Z, and generating an intensity map based on the collision density calculated for each pixel PX, wherein an intensity indicator is based on the collision density.

It should be appreciated that the described method 500 may include additional acts and/or alternative acts corresponding to the features described previously with respect to the system 300 and evaluation module 350 (see FIG. 3).

In the following, a detailed method, also referred to as algorithm for location tracking and/or distance monitoring, is provided. In the example, tag location co-ordinates are collected from the real location database 130 every second. The algorithm is described for a location sample LS for a specific point in time (T=t).

STEP1: Calculating Violation Clusters, VC (T=t, R)

1. Group tags into one the three categories - added, removed, updated.
2. Process batch of added/removed/updated tags:
    a. Define coverage region around the tag.
    b. Using trigonometric math functions find all the pixels inside the tag coverage radius R.
        For every pixel in the region:
            i. Validate: pixel coordinate must lie inside floor plan.
            ii. Validate: no wall should obstruct the tag and pixel:
                Using linear algebra check if both tag and pixel lies on the same side of the wall.
                    IF Yes: Wall is not obstructing, do nothing further.
                    IF No: Create imaginary wall joining tag and pixel and check if actual wall end point co-ordinates lies on the same -continued side of this imaginary wall:
        IF Yes: Wall is not obstructing.
        IF No: Wall is obstructing.
    c. For every validated pixel of every tag, after adding/removing/updating tag information maintain a final list of all associated tags.
  3. After removing the necessary tags, create a list all such validated pixel co-ordinate from all the tags, which now exists.
  4. From all these validated pixels co-ordinate and their associated tags list, filter out unique tag cluster sets.
  5. Collision density for a pixel becomes the number of tags in the associated list.

VC = Violation Cluster, T = Time, R = coverage Radius

STEP2: Calculating Dwell Time Violations, DTV (T=t, DT)
DT=Dwell Time, DTV=Dwell Time Violation, VC=Violation Cluster, T=Time
1. Find current violation clusters VC (T=t) as described in STEP1.
2. Identify all violating tag pairs in a violation cluster.
3. Filter unique violation pairs from every such violation cluster.
4. Create a list of all such unique violation pairs.
5. Identify and filter out all the violation pairs which are also present in violation pairs of VC (T=t−1), VC (T=t−2), VC (T=t−3) VC (T=t−DT)
6. Prepare a list of all such violation pairs which pass the above test.

STEPS: Calculating Dwell Time Violation Durations DTVD (T=t, ST, ET, DT)
DT=Dwell Time, DTV=Dwell Time Violation, VC=Violation Cluster, T=Time, ST=Start Time, ET=End Time
1. Find dwell time violation DTV (T=t, DT) as described in STEP2, where t=ET.
2. For every violation pair set Start Time=(t−DT).
3. For every violation pair set End Time=t.
4. For every violation pair check if it is also present in DTV (T=t−1, DT)
    a. If Yes: update Start Time to be t−1−DT.
    b. If No: Do nothing.
5. Keep checking past dwell time violation and updating Start Time until t=ST.

Figure 6:
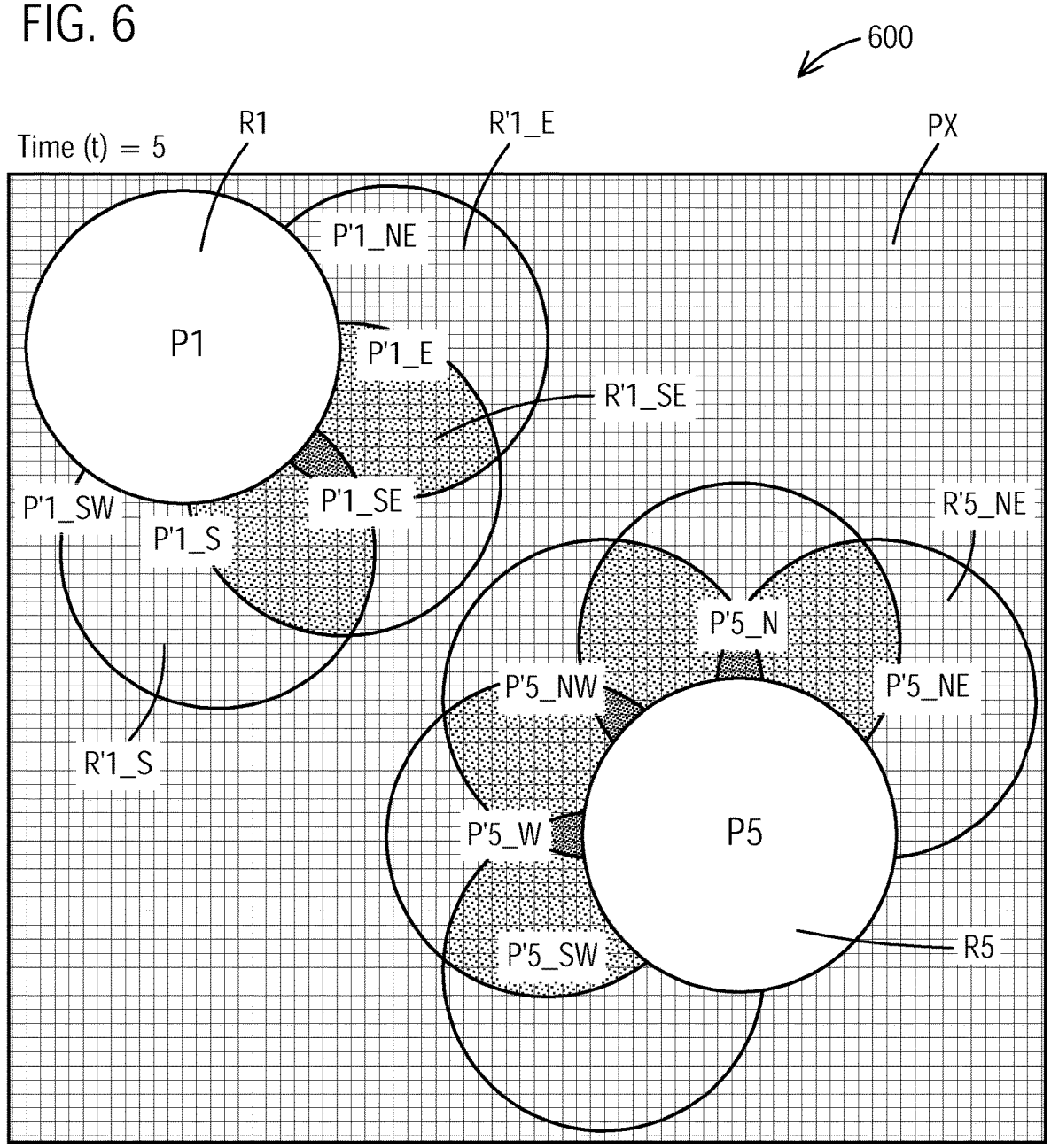
FIG. 6 illustrates a diagram of tags and future locations of the tags for avoiding future collision in accordance with an exemplary embodiment of the present disclosure.

FIG. 6 illustrates a diagram 600 of tags and possible future locations of the tags for avoiding future collision in accordance with an exemplary embodiment of the present disclosure.

Diagram 600 illustrates tags P1 and P5 at time (t)=5, each tag P1 and P5 identifying or representing portable transponder attached to a person or mobile device. As described before, each tag P1 and P5 comprises a coverage region R1 and R5 based on a selected coverage radius r, which is for example r=3 feet.

In an embodiment, the described system 100 and method/algorithm 500 is used to trigger advanced alerts for avoiding future collision, e.g. avoiding future dwell time violations, between different tags, wherein the method/algorithm 500 may run or process in a smaller base cycle. The distance monitoring module 150 is further configured to determine future overlapping zones of future location data of the tags, the future location data being derived from the current location data of the tags, in order to avoid a future collision or future tag cluster. In this scenario, inputs to the method/algorithm 500 are current locations of the tags P1 and P5, and possible expected locations for the tags P1 and P5. Such possible directions or locations for movement can be for example four (4) or eight (8) directions/locations. For example, from a current position of the tags P1, P5, the tags P1, P5 (transponder) may move East (E), West (W), North (N), South (S), North-East (NE), South-East (SE), South-West (SW), North-West (NW).

FIG. 6 shows some of the possible locations/directions for tags P1 and P5. Possible future locations for P1 at a time (t)=6, include P'1_NE, P'1_E, P'1_SE, P'1_S and P'1_SW. For each possible future location P'1_NE, P'1_E, P'1_SE, P'1_S and P'1_SW of the tag P1, a coverage region R'1 is defined in order to determine possible future overlapping zones, tag clusters or dwell time violations. Although FIG. 6 shows only three coverage regions R'1_E, R'1_SE and R'1_S for P_1, each future location P'1 comprises a coverage region R'1. For tag P5, possible future locations at time (t)=6 include P'5_NE, P'5_N, P'5_NW, P'S_W and P'S_SW with coverage regions R'S, such as for example R'5_NE.

At the time (t)=5, dwell time violation checks are performed for P1 and P5, wherein no tag cluster or dwell time violations are present. Further, at time (t)=5, dwell time violation checks are performed between P'1_E, P'1_SE, P'1_S and P'5_NE, P'5_N, P'5_NW, P'S_W and P'S_SW. In this example, no overlapping zones are found or determined between P'1_E, P'1_SE, P'1_S and P'5_NE, P'5_N, P'5_NW, P'5_W and P'S_SW and therefore, no alert for any future violation based on a possible future tag cluster generated. If an overlapping zone would exist between any future location, for example between P'1_SE and P'5_NW, a warning or alert may be issued or generated. Such a warning or alert may notify the person carrying the transponder of a possible future collision when moving in a specific direction/location. Further, the warning or alert may be displayed by the GUI 160 to a user or operator of the system 100 (see FIG. 1).

In another embodiment, location/position data of each transponder 102, 104, 106 can be used for contact tracing. As described before, the real time location data is stored in the location database 130. All movements of the transponders 102, 104, 106 can be stored as a movement history. In the example of the coronavirus pandemic, contact tracing and movement history can be used to alert employees who have been in close contact with an employee who tests positive.

The described systems and methods provide distance monitoring, specifically to monitor social or physical distances between people in order to keep them safe and healthy. As noted, as plants and manufacturing facilities work to return to full capacity with the new challenges created by the coronavirus pandemic, operation managers and health and safety officials must keep employees safe while also optimizing production. The systems and methods for location tracking and distance monitoring help maintain social distancing and help plant managers and operation managers optimize facility layouts. Further, the provided system and method supports in keeping employees safe while keeping facility running, quickly identify at risk employees and helps ensure compliance with government guidelines. Furthermore, compliance with social distancing guidelines is monitored in real time, hot spots of unsafe violations are easily identified and helps to improve facility layout and helps identifying employees at risk of exposure.

It should be appreciated that acts associated with the above-described methodologies, features, and functions (other than any described manual acts) may be carried out by one or more data processing systems, such as for example module 150, via operation of at least one processor 152, see FIG. 1. As used herein, a processor corresponds to any electronic device that is configured via hardware circuits, software, and/or firmware to process data. For example, processors described herein may correspond to one or more (or a combination) of a microprocessor, CPU, or any other integrated circuit (IC) or other type of circuit that is capable of processing data in a data processing system. The processor 152 that is described or claimed as being configured to carry out a particular described/claimed process or function may correspond to a CPU that executes computer/processor executable instructions stored in a memory in form of software and/or firmware to carry out such a described/claimed process or function. However, it should also be appreciated that such a processor may correspond to an IC that is hard wired with processing circuitry (e.g., an FPGA or ASIC IC) to carry out such a described/claimed process or function.

In addition, it should also be understood that a processor that is described or claimed as being configured to carry out a particular described/claimed process or function may correspond to the combination of the processor with the executable instructions (e.g., software/firmware apps) loaded/installed into a memory (volatile and/or non-volatile), which are currently being executed and/or are available to be executed by the processor to cause the processor to carry out the described/claimed process or function. Thus, a processor that is powered off or is executing other software, but has the described software installed on a data store in operative connection therewith (such as on a hard drive or SSD) in a manner that is setup to be executed by the processor (when started by a user, hardware and/or other software), may also correspond to the described/claimed processor that is configured to carry out the particular processes and functions described/claimed herein.

Further, it should be understood, that reference to "a processor" may include multiple physical processors or cores that are configured to carry out the functions described herein.

It is also important to note that while the disclosure includes a description in the context of a fully functional system and/or a series of acts, those skilled in the art will appreciate that at least portions of the mechanism of the present disclosure and/or described acts are capable of being distributed in the form of computer/processor executable instructions (e.g., software and/or firmware instructions) contained within a data store that corresponds to a non-transitory machine-usable, computer-usable, or computer-readable medium in any of a variety of forms. The computer/processor executable instructions may include a routine, a sub-routine, programs, applications, modules, libraries, and/or the like. Further, it should be appreciated that computer/processor executable instructions may correspond to and/or may be generated from source code, byte code, runtime code, machine code, assembly language, Java, JavaScript, Python, Julia, C, C#, C++, Scala, R, MATLAB, Clojure, Lua, Go or any other form of code that can be programmed/configured to cause at least one processor to carry out the acts and features described herein. Still further, results of the described/claimed processes or functions may be stored in a computer-readable medium, displayed on a display device, and/or the like.

The invention claimed is:

1. A location tracking and distance monitoring system comprising:
   a plurality of portable transponders, each portable transponder comprising a wireless transmitter and configured to transmit location data,
   a location database storing the location data transmitted by the plurality of portable transponders, wherein each portable transponder is identified as a tag with co-ordinates in the location database,
   a distance monitoring module comprising at least one processor and configured via computer executable instructions to
      access the location data from the location database,
      define a coverage region with a coverage radius around each tag,
      determine overlapping zones of the coverage regions of the tags, and
      generate tag clusters based on the overlapping zones.

2. The location tracking and distance monitoring system of claim 1, wherein the location data comprises real time location data, and wherein the distance monitoring module continually accesses the location data to obtain real time location data of the plurality of portable transponders.

3. The location tracking and distance monitoring system of claim 1, wherein the distance monitoring module is further configured to
   identify tag pairs of each tag cluster, and
   calculate a dwell time for each tag pair while the tag pair is associated with the tag cluster.

4. The location tracking and distance monitoring system of claim 3, wherein the distance monitoring module is further configured to
   generate a dwell time violation alert when a calculated dwell time of the tag pair associated with the tag cluster is greater than a predefined period.

5. The location tracking and distance monitoring system of claim 1, wherein the coverage region around each tag comprises pixels, and wherein each pixel represents a segment of an area.

6. The location tracking and distance monitoring system of claim 5, wherein the distance monitoring module is further configured to
   validate the pixels of each tag such that the tag and the pixels of the coverage region around the tag are within the area and are not obstructed by an object in the area.

7. The location tracking and distance monitoring system of claim 6, wherein the distance monitoring module is further configured to
   calculate a collision density for each pixel in an overlapping zone based on a number of tags associated with the overlapping zone.

8. The location tracking and distance monitoring system of claim 7, wherein the distance monitoring module is further configured to
   generate an intensity map based on the collision density calculated for each pixel, wherein an intensity indicator is based on the collision density.

9. The location tracking and distance monitoring system of claim 8, wherein the intensity map comprises intensity zones, and wherein an intensity zone comprises pixels with a same intensity indicator.

10. The location tracking and distance monitoring system of claim 1, wherein the distance monitoring module is further configured to
    calculate future overlapping zones of future location data of the tags, the future location data being derived from the current location data of the tags, in order to avoid a future collision or future tag cluster.

11. A method for tracking location and monitoring distance, through operation of at least one processor, comprising:

accessing location data of multiple portable transponders from a location database, wherein each portable transponder is identified in the database as a tag comprising co-ordinates, defining a coverage region with a coverage radius around each tag, determining overlapping zones of the coverage regions of the tags, and generating tag clusters based on the overlapping zones.

12. The method for monitoring distances of claim 11, wherein the location data comprise real time location data and accessing the location data comprises continually accessing real time location data.

13. The method for monitoring distances of claim 11, further comprising:

identifying tag pairs of each tag cluster, and calculating a dwell time for each tag pair while the tag pair is associated with the tag cluster.

14. The method for monitoring distances of claim 13, further comprising:

generating a dwell time violation alert when a calculated dwell time of the tag pair associated with the tag cluster is greater than a predefined period.

15. The method of claim 11, wherein the coverage region around each tag comprises pixels, and wherein each pixel represents a segment of an area.

16. The method of claim 15, further comprising:

validating the pixels of each tag such that the tag and the pixels of the coverage region around the tag are within the area and are not obstructed by an object in the area.

17. The method of claim 15, further comprising:

calculating a collision density for each pixel in an overlapping zone based on a number of tags associated with the overlapping zone.

18. The method of claim 17, further comprising:

generating an intensity map based on the collision density calculated for each pixel, wherein an intensity indicator is based on the collision density.

19. The method of claim 18, further comprising:

calculating future overlapping zones of future location data of the tags, the future location data being derived from the current location data of the tags, in order to avoid a future collision or future tag cluster.

20. A non-transitory computer readable medium encoded with processor executable instructions that when executed by a computing device, cause the computing device to perform a method for monitoring distances as claimed in claim 11.

* * * * *